Patented Feb. 9, 1937

2,070,014

UNITED STATES PATENT OFFICE 2,070,014

SOLID LUBRICANTS AND METHOD OF MANUFACTURING THE SAME

Bert H. Lincoln and Ernest W. Nelson, Ponca City, Okla., assignors to Continental Oil Company, Ponca City, Okla., a corporation of Delaware No Drawing. Application May 3, 1935, Serial No. 19,652

8 Claims. (Cl. 87—9)

Our invention relates to solid lubricants in the nature of solid lubricating greases and likewise to the method of manufacturing that type of solid lubricants which are especially adapted for bearings operating at changing speeds under conditions of high pressures and high temperatures. These are the usual operating conditions of locomotive driving journals and those lubricants designed for this particular use are known as "Driving Journal Compounds".

In comparison with the highly perfected bearings of light modern high speed motors and engines, the driving journals of railway locomotives must be considered as relatively low R. P. M. Since they are comparatively crude in construction and operate under extremely high loads a very considerable amount of heat is generated and any lubricant that is employed must be capable of providing satisfactory service under such extreme conditions.

With heavy slow speed bearings operating under high pressures and high temperatures, a condition of thin film or boundary lubrication is obtained and the lubricant that is used must possess sufficient oiliness characteristics that there will not be film rupture with resulting metal to metal contact and bearing failure.

In making a suitable and satisfactory lubricant for railway driving journals and other heavy slow speed bearings operating under heavy loads at relatively high temperatures, there are a number of desirable and essential chemical and physical properties to be sought. A few of the most important and necessary properties that such a lubricant must possess are as follows:

The lubricant should be sufficiently hard or dense that it can be readily molded or formed into blocks and cakes of desirable size and retain its structural shape during any handling operations. The hard and dense character of this grease should be of a certain nature and be characterized by a certain texture and structure peculiar to our product. It should have a melting point high enough that it will not soften and resolve itself into a thin non-viscous material at the optimum operating temperatures. This requires a melting point above 350° F.

While the grease should be hard enough that it will maintain its shape and not soften and cause undue consumption at the ordinary operating temperatures, yet it must be of a texture and consistency that it will afford sufficient lubrication for low temperature starting operation. When the ordinary hard types of driving journal compounds of the usual texture are used a considerable amount of power is consumed in overcoming initial resistance and solid friction, because the type of hardness and texture combined with a high melting point do not provide any lubrication until the friction of the moving parts has raised the bearing temperature sufficiently high to cause the grease to soften and flow. As a result the journals run practically dry until such temperatures are reached.

In order to insure proper lubrication both at low and high operation temperatures and under the conditions which contribute to boundary lubrication, the lubricant must be possessed of the proper oiliness and texture characteristics. These properties of increased oiliness and improved texture can be obtained by the method of manufacture and by the retention of a small quantity of the residual glycerine in the finished product. The residual glycerine is that glycerine obtained as a secondary product in the saponification of a whole fat or glyceride. The amount of glycerine must not be so large as to cause the lubricant to be soft and of weak structure, and yet it should be large enough that the grease is of the proper texture that it will be sufficiently adhesive in nature to provide a lubricating film on the working parts under all conditions.

Since the usual operating temperatures of railway driving journals are considerably above that of the boiling point of water, it is obvious that the grease must be practically water free, in order to avoid softening and expansion caused by expelling of the moisture. The presence of water is objectionable in the manufacture of our product for the same reasons and is therefore minimized. The fact that the lubricant must be water free and also have a high melting point precludes the use of a calcium base soap, which must contain water in order to be stable, to avoid separation. The satisfactory lubricant usually consists of a dehydrated soda base grease.

Another highly desirable property for a grease of this type is a low temperature consistency differential. By this is meant a small change in consistency over the range of temperatures encountered in normal operation. Some greases having the correct degree of hardness at normal temperatures become extremely hard when subjected to cold. Likewise they become soft and semifluid at high temperatures. Neither condition is conducive to good operation and a grease with the lowest temperature consistency differential is to be preferred since it will provide the most adequate lubrication over the widest range of temperatures. As explanation of what is meant by temperature consistency differential, the following example is given: Two greases, both having a penetration of 40 at 77° F. were cooled to a temperature of 32° F. and their penetrations determined. The first had a penetration of 10, the second, 28. The same two greases were then raised in temperature to 190° F. and their penetrations taken again. The first showed a figure of 140, the second, 80. The consistency differential between the two temperatures shown was 130 for the first sample and 52 for the second. While these two greases were both designed for the same use, it is obvious that the one undergoing the least change in consistency over the operating range of temperatures is to be preferred both from the viewpoint of actual lubrication and grease consumption. A grease may appear by test to have the correct degree of hardness and possess other desirable properties, yet when this grease is placed in actual service and subjected to low winter temperatures, it may attain such extreme hardness as to provide no lubrication whatever until frictional heat causes it to soften. In a similar manner, such a grease may soften so rapidly with increasing temperatures as to actually become light enough to flow from the bearings with attendant poor lubrication and excessive consumption.

Many of the usual types of driving journal compounds do not possess the property of low temperature consistency differential and if made soft enough to function satisfactorily at the low temperatures often soften to such an extent at the higher temperatures as to be very unsatisfactory and result in loss by "fanning out". The proper degree of hardness and type of texture is possible only by a very careful control of the various components and the method of manufacture. In some of the usual greases of this type no control is exercised other than quantity of raw materials with the result that those combined characteristics which have been proved to be extremely important are not present.

In the practice of our invention the quality and quantities of the individual components as well as the method of manufacture are so controlled that it is possible to obtain any desired results by only slight variations in procedure. However, it is by means of our particular method of manufacture, especially that of soap manufacture, that we are able to obtain the highly important properties of texture and temperature consistency differential which characterize our product.

Since the mineral oil employed largely effects the actual lubricating value of the grease, it is essential that a high quality mineral lubricating oil be used. For this purpose a steam refined stock or refined residual oil sometimes termed as cylinder oil is commonly used. It should be understood that a well refined vacuum distilled cylinder stock may be used in this type of grease with success. It is essential that a low wax content oil be used in order to keep the temperature consistency differential of the grease at a minimum. Wax becomes extremely hard and brittle at low temperatures. Above its melting point it is water thin and non-viscous. Hence it is readily apparent that the presence of even a small amount of wax is undesirable and should not be included.

Another highly desirable property of this class of greases is that the grease when melted to a fluid state will return to its original solid condition upon cooling without any material change in its texture or lubricating qualities. This property is of value when the grease is formed into cakes or blocks in order to make use of any small or irregularly shaped portions and to conserve the remaining quantities of previously used blocks.

Having thus described what are considered as the desirable properties of a satisfactory lubricant for railway driving journals it is the object of this invention to provide a lubricant of the class described and which will possess these desirable properties.

Another object of this invention is to produce a lubricating grease having a characteristic texture and low temperature consistency differential. The latter property has been found of utmost importance in providing a grease of superior lubricating value which functions equally well both at low and high temperatures. These properties are obtained by a careful control of the components entering into the product as well as the products of reaction and the particular method of manufacture.

A further object of this invention is to produce a lubricating grease composed essentially of a high melting point soap and a high boiling point hydrocarbon oil, which is practically dehydrated and which possesses the additional desirable properties of hard, dense structure, high melting point, increased oiliness, low coefficient of friction and increased adhesiveness. This grease is particularly suitable for bearings operating at low revolution of the journal and with varying amounts of frictional speeds under high temperature conditions and heavy loads.

Another object of this invention is to enable the production of a lubricating grease having the previously described desirable properties and which is composed of a mixture of hydrocarbon oil and high melting point soap. The percentage of soap that is necessary depends upon the particular use for which the grease is intended. If the soap is prepared properly and is blended properly with the hydrocarbon oil, the percentage of soap in the finished product may vary from 30 percent in the softer greases to as much as 60 percent in the very dense, block greases and still obtain the characteristics of improved texture and temperature consistency differential. In general, the soap and mineral oil are present in substantially equal proportions.

In general outline the desirable product of this invention is obtained by the special method of manufacturing. The new product of improved properties is obtained by preparing the soap with a carefully blended mixture of fatty acids and whole fats or glycerides and then saponifying this mixture under controlled conditions with a concentrated alkaline solution. The soap resulting is further processed until substantially dehydrated and carefully adjusted as to content of free alkali. We have found that both of these factors are very important in controlling the physical character of our finished product. If not dehydrated to the desired point before the hydrocarbon oil is added the finished grease has a relatively heterogeneous texture which adversely affects the commercial application of the grease. Our theory is that the excessive quantity of water, when converted to enormous volumes of steam in the presence of the hydrocarbon oil has a tendency to prevent the soap and oil from combining properly and the resultant mixture from solidifying into a dense solid product of proper texture and temperature consistency differential. If the free alkali content is not properly adjusted before adding the hydrocarbon oil the texture and temperature consistency differential are likewise adversely affected. Probably the free alkali has some chemical affinity for some component of the hot oil which results in a mixture of undesirable properties. After the soap component is properly prepared the hydrocarbon oil component is carefully added and incorporated. Temperature, time and degree of blending are of utmost importance in obtaining our desired product. We have also found that a small amount of glycerine must be retained in the finished grease to obtain the desired properties. Too much glycerine gives a finished product which is relatively soft and weak in texture while an insufficient quantity gives a dry, friable, poor texture and poor temperature consistency differential product. There are three methods of controlling the glycerine content which we have discovered: One, adjusting the blend of fatty acid and whole fat; two, temperature and time of cooking; and three, a combination of the previous two methods.

By our improved method of preparation it is possible to handle much larger sized batches without danger of excessive boiling and subsequent overflow of the kettle as now frequently experienced by manufacturers of driving journal compound.

Our method also results in a considerable saving of time in that the soap may be properly dehydrated much more rapidly in the absence of mineral oil. It is possible that the long time heating for dehydration as practiced by others adversely affects the consistency of the finished product.

In order to more clearly illustrate the invention a specific example will be given but it is not intended that our invention shall be limited to the particular proportions or ingredients herein stated. A lubricating grease which was shown to possess superior lubricating qualities for the lubrication of railway driving journals and other heavy slow speed bearings operating under actual service conditions was prepared by the following formula:

| | Per cent |
|---|---|
| Hard tallow | 18.0 |
| Stearic acid | 18.0 |
| Flake caustic soda | 5.8 |
| Steam refined cylinder stock | 58.2 |

In preparing the grease from the above ingredients an open top fire heated kettle is employed of sufficiently large capacity to allow for considerable expansion. It is essential that the kettle be fire heated or otherwise provided for high temperature cooking in order that the grease may be raised to a sufficiently high temperature to vaporize a portion of the glycerine content.

The stearic acid, preferably in a granular form to facilitate handling and melting, and the tallow are added to the kettle and sufficient heat applied to melt them. This temperature is usually between 150–200° F. during and after melting the stearic acid and tallow are well mixed. The caustic soda is dissolved in a conveniently small amount of water and added to the melted fats with slow agitation. After a thorough mixing a heavy homogeneous mixture results due to the partial neutralization and saponification of the fats.

At this point the heat on the kettle is gradually increased and a more vigorous reaction is obtained. By means of a carefully regulated increase in heat, substantially complete neutralization and saponification of the fats is obtained by the time the soap is practically dehydrated without encountering a violent boil or any excessive increase in volume. This method of procedure easily permits the preparation of large sized batches as no additional space need be allowed for expansion, nor provision made to prevent the mass from overflowing the kettle.

It is essential that the free alkali content of the finished grease be carefully controlled in order to obtain the improved product of our invention. We have found that a free alkali content ranging from 0.2 percent to 1.5 percent is highly desirable and will result in a product of the desired characteristics of texture and temperature consistency differential. If the free alkali content is less than 0.2 percent, there is a tendency for the grease to be weak and of low structural strength due to the presence of a small amount of unsaponified fats. This tendency becomes more noticeable as the free fat content increases. When the free alkali content exceeds a quantity of approximately 1.5 percent, there is a tendency for the grease to be more friable and dry and more susceptible to oxidation. This condition of hardening and oxidation may proceed under favorable circumstances to such an extent as to render the grease entirely unsuitable for lubrication.

While we speak of the desirable features of a completely dehydrated grease there are certain limitations by which we must be governed. From a strictly technical viewpoint it is practically impossible to dehydrate a grease of this type to such a degree that it will not give an indication of moisture. In the process of eliminating the water content it is possible that certain hydrates may be formed of considerably higher melting point than that of the total mass and are not broken up at the temperatures attained in the cooking process. However, for all practical purposes, a trace of moisture does not detract from the satisfactory operation of the lubricant and accordingly we limit the water content of our improved product to a maximum of .2 percent. Above that amount it does have the tendency to cause a noticeable amount of swelling and expansion above the boiling point of water which is very undesirable.

When the soap is practically dehydrated and the free alkali content adjusted as previously described and as evidenced by the usual increase in temperature at this point, the steam refined cylinder stock is added gradually so that the temperature of the batch is not materially reduced. If the temperature is reduced the texture of the finished grease is materially affected for at this point the soap and mineral oil readily combine to form a uniform homogeneous plastic mixture by slow gradual mixing. During the step of adding the mineral oil the remaining small quantity of moisture is removed and a completely dehydrated mixture results as far as practical applications are involved. The temperature of the batch is now approximately 300–350° F.

After the mineral oil has been added, the mass is heated to a temperature substantially above the solid point of the mixture or usually 400° F.

or higher, care being taken that the flash point of the mineral oil is not greatly exceeded. It is for this reason that we specify a high boiling point hydrocarbon oil in the practice of our invention. If the oil does not possess a sufficiently high flash point, a considerable amount of vapor loss occurs at the higher cooking temperatures as well as present a dangerous fire hazard. High oil vapor loss has a tendency to reduce the glycerine content by the carrying effect of the oil vapors.

The mass is held at the elevated temperature for a desired period of time which may vary from 30 minutes to 3 hours, during which time a substantial portion of the glycerine, formed by saponification of the glyceride, is removed by vaporization. However, it is particularly important that not all of the glycerine be removed or the quality of the resulting lubricant will be impaired.

During the removal of the glycerine a slight boil is evidenced by the appearance of a light foam on the surface of the mass. The correct quantity of glycerine to be left in the mixture is determined by the point at which the foam caused by the vaporized glycerine starts decreasing. This will leave a glycerine content in the finished product of a maximum .5%. Small quantities (on the order of .5% or less) of glycerine materially improves the quality of the lubricant by insuring a more uniform and homogeneous mixture of the soap and mineral oil, of proper temperature consistency differential as well as providing a lower coefficient of friction.

The mixture, in a liquid condition, is drawn from the kettle into suitable containers or molds and allowed to cool and harden.

The finished grease, after cooling, comprises a solid, relatively hard, dense, high melting point product which has been found to be very satisfactory for the lubrication of bearings, carrying heavy loads and subjected to relatively high temperatures, such for example as locomotive driving journals.

The properties of the resulting grease are obviously dependent upon the proportions and characteristics of the raw materials used and this invention does not intend to be limited to those proportions and raw materials cited as specific examples.

However, where a grease is made by a formula similar to that previously specified, by one skilled in the art, a product having the following characteristics will be obtained:

| | |
|---|---|
| Soap as sodium stearate | 38.6% |
| Free alkali (NaOH) | 0.2 to 1.5% |
| $C_3H_5(OH)_3$ glycerine | .01 to .50% |
| S. R. cylinder stock | 60.8% |
| $H_2O$ (water) | 0 to .20% |
| Melting point (drop method) | 430° F. |
| Penetration (ASTM) 32° F | 28 |
| Penetration (ASTM) 77° F | 46 |
| Specific gravity | .90 to .95 |
| Color | Dark brownish green |
| Appearance | Solid block grease |
| Texture | Dense, hard, nonfibrous |

While we preferably use a mixture of approximately equal proportions of hard tallow and refined, well pressed stearic acid in the practice of this invention, it is understood that we do not intend to be limited thereto but contemplate the use of any mixture of fatty acids and glycerides, which will produce a finished solid grease of the desired characteristics. The use of specifically hardened fats such as the hydrogenated fatty acids and glycerides are of advantage in obtaining harder, higher melting point products.

The product of this invention has been found to possess superior lubricating properties which are particularly noted in a marked economy of grease consumption and reduction of power losses.

This is particularly noticeable in the lubrication of bearings operating at high temperatures and carrying heavy loads, as for example locomotive driving journals.

Obviously, many modifications and variations of the invention, as hereinbefore set forth, may be made without departing from the spirit and scope thereof, and therefore only such limitations should be imposed as are indicated in the appended claims.

Having thus described our invention, what we claim is:

1. A process of manufacturing solid lubricants including the steps of mixing stearic acid and tallow while heating the mixture to a temperature of from 150 degrees to 200 degrees Fahrenheit, saponifying the mixture with sodium hydroxide while gradually increasing the temperature from 200 degrees Fahrenheit to not in excess of substantially 350 degrees Fahrenheit, the sodium hydroxide being used in amount to give a free alkali content from two tenths of one percent to one and five tenths percent by weight, continuing the heating until the water content of the saponified mixture is two tenths of one percent or less by weight, adding a heavy hydrocarbon oil to the dehydrated, saponified mixture at such rate as to substantially maintain the temperature of the mixture, raising the temperature of the mixture to four hundred degrees Fahrenheit or higher, but not above the flash point of the hydrocarbon oil added, holding the mixture at said temperature for a period of one half to three hours, and then allowing the mixture to cool and harden.

2. A process of manufacturing solid lubricants including the steps of mixing stearic acid and tallow while heating the same to a temperature in excess of heir melting points, saponifying the mixture with an excess of sodium hydroxide while gradually increasing the temperature, maintaining the temperature of the saponified mixture until it is substantially dehydrated, adding a high boiling hydrocarbon oil to the dehydrated saponified mixture while maintaining the temperature of the same, then increasing the temperature of the mixture and holding the increased temperature for a period of time, and finally allowing the mixture to cool and harden.

3. In the process of manufacturing solid lubricants in which stearic acid and tallow are heated and saponified, the saponified mass dehydrated and a heavy hydrocarbon oil added thereto, the step of maintaining the temperature of the resulting mixture at a point not in excess of the flash point of the hydrocarbon oil until a decrease in frothing is observed and then withdrawing the mixture and permitting it to cool and harden.

4. The process of manufacturing solid lubricants including the step of mixing tallow and stearic acid at temperatures in excess of their melting points, saponifying the mixture with a quantity of sodium hydroxide with free alkali in amount from two tenths of one percent to one and five tenths percent, while gradually increasing the temperature of the mixture, maintaining the mixture at increased temperatures to substantially dehydrate the same and then adding a viscous hydrocarbon oil to the saponified, dehydrated mixture.

5. In a process of manufacturing solid lubricants in which stearic acid and tallow are saponified and blended with the hydrocarbon oil, the steps of first saponifying a heated mixture of stearic acid and tallow with an excess of sodium hydroxide, maintaining the saponified mass at an elevated temperature to substantially dehydrate the same, and then blending a high boiling hydrocarbon oil with the dehydrated, saponified mass.

6. A solid lubricant having the following characteristics:

| | |
|---|---|
| Soap as sodium stearate | 38.6% |
| Free alkali (NaOH) | 0.2 to 1.5% |
| $C_3H_5(OH)_3$ glycerine | .01 to .50% |
| S. R. cylinder stock | 60.8% |
| Water | 0 to .20% |
| Melting point (drop method) | 430° F. |
| Penetration (ASTM) 32° F | 28 |
| Penetration (ASTM) 77° F | 40 |
| Specific gravity | .90 to .95 |
| Color | Dark brownish green |
| Appearance | Solid block grease |
| Texture | Dense, hard, nonfibrous |

7. A solid lubricant having the following characteristics:

| | |
|---|---|
| Soap as sodium stearate | 38.6% |
| Free alkali (NaOH) | 0.2 to 1.5% |
| $C_3H_5(OH)_3$ glycerine | .01 to .50% |
| S. R. cylinder stock | 60.8% |
| Water | 0 to .20% |
| Melting point (drop method) | 430° F. |
| Penetration (ASTM) 32° F | 28 |
| Penetration (ASTM) 77° F | 40 |
| Specific gravity | .90 to .95 |

8. A solid lubricant having the following characteristics:

| | |
|---|---|
| Soap as sodium stearate | 50.0% |
| Free alkali (NaOH) | 0.2 to 1.5% |
| $C_3H_5(OH)_3$ glycerine | .01 to .50% |
| S. R. cylinder stock | 49.0% |
| Water | 0 to .20% |
| Melting point (drop method) | 440° F. |
| Penetration (ASTM) 32° F | 10.0 |
| Penetration (ASTM) 77° F | 20.0 |
| Specific gravity | .90 to 1.0 |

BERT H. LINCOLN.
ERNEST W. NELSON.